United States Patent [19]
Okubo et al.

[11] Patent Number: 5,221,101
[45] Date of Patent: Jun. 22, 1993

[54] POWER TRANSMITTING SYSTEM FOR FOUR-WHEEL DRIVE VEHICLE

[75] Inventors: Kiyokazu Okubo; Tetsuro Hamada; Kazunori Shibuya; Kentaro Arai, all of Saitama, Japan

[73] Assignee: Honda Giken Kogyo Kabushiki Kaisha, Tokyo, Japan

[21] Appl. No.: 676,754

[22] Filed: Mar. 26, 1991

[30] Foreign Application Priority Data

Mar. 26, 1990 [JP] Japan ................................. 2-75946

[51] Int. Cl.$^5$ ..................... B60K 17/34; F16D 25/063
[52] U.S. Cl. ........................................ 180/247; 60/437; 180/248
[58] Field of Search ............... 180/248, 233, 247, 249; 60/535, 435, 437, 431, 486; 475/82, 72, 76; 192/103 F, 85 AA

[56] References Cited

U.S. PATENT DOCUMENTS

| | | | |
|---|---|---|---|
| 4,719,998 | 1/1988 | Hiramatsu et al. | 180/233 |
| 4,924,989 | 5/1990 | Filderman | 192/103 F |
| 5,080,187 | 10/1990 | Asano et al. | 180/248 |

FOREIGN PATENT DOCUMENTS

0134349 6/1988 Japan ................................. 180/233

Primary Examiner—Margaret A. Focarino
Assistant Examiner—Anne Marie Boehler
Attorney, Agent, or Firm—Lyon & Lyon

[57] ABSTRACT

A power transmitting system for a four-wheel drive vehicle includes a first hydraulic pump driven interlockingly with the rotation of front wheels, a second hydraulic pump driven interlockingly with the rotation of rear wheels, and a hydraulic clutch for connecting the front wheels and rear wheels. The hydraulic clutch is adapted to be brought into an engaged state by an increase in oil pressure based on the difference between the amount of oil discharged from one of the hydraulic pumps and the amount of oil drawn into the other hydraulic pump. The hydraulic clutch, first hydraulic pump and second hydraulic pump are arranged in that sequence from the front toward rear of the vehicle on an axis extending longitudinally of the vehicle to maximize the air cooling effect on the hydraulic clutch and minimize the length of oil passages between the two hydraulic pumps.

11 Claims, 6 Drawing Sheets

POWER TRANSMITTING SYSTEM FOR FOUR-WHEEL DRIVE VEHICLE

The present invention relates to a power transmitting system for a four-wheel drive vehicle and, in particular, a system that uses hydraulic pumps and a clutch for controlling the relative driving forces applied to the front and rear wheels. Specifically, this invention relates to such a system that includes a first hydraulic pump driven interlockingly with the rotation of the front wheels, a second hydraulic pump driven interlockingly with the rotation of the rear wheels, and a hydraulic clutch for connecting the front wheels and rear wheels, wherein the hydraulic clutch is adapted to be brought into an engaged state by the oil pressure increase based on the difference between the amount of oil discharged from one of the hydraulic pumps and the amount of oil drawn into the other hydraulic pump.

Such a power transmitting system for a four-wheel driven vehicle has been already proposed in Japanese Patent Application No. 295727/89 by the present applicant. With the prior power transmitting system, when the rotational speed of the front wheels to which a driving force from an engine is transmitted directly is more than that of the rear wheels, the hydraulic clutch is engaged in accordance with a difference between such rotational speeds, so that the driving force from the engine is distributed to the rear wheels. When the rotational speeds of the front and rear wheels become equal, or when the rotational speed of the rear wheels is more than that of the front wheels, the hydraulic clutch is not engaged, so that the distribution of the driving force to the rear wheels is cut off.

The above prior art power transmitting system has some following disadvantages that are overcome by this invention. In the prior art system, since the hydraulic clutch is interposed between the first hydraulic pump mounted on an input shaft extending rearwardly from a differential for the front wheels and the second hydraulic pump mounted on an output shaft extending forwardly from a differential for the rear wheels for connecting the input and output shafts, the oil passages connecting ports of the first and second hydraulic pumps must extend around the hydraulic clutch resulting in an increased length of the oil passages which causes an increased flow resistance. In addition, since the first hydraulic pump is disposed in front of the hydraulic clutch, the cooling effect provided by air while the vehicle is running is blocked by the first hydraulic pump and cannot sufficiently spread to the hydraulic clutch, with the result that the hydraulic clutch is not cooled sufficiently.

Accordingly, it is an object of the present invention to provide a power transmitting system for a four-wheel drive vehicle, wherein the oil passage connecting the ports of the first and second hydraulic pumps is shortened, and the hydraulic clutch is cooled efficiently.

To achieve the above object, according to the preferred embodiment of the present invention, there is provided a power transmitting system for a four-wheel drive vehicle, comprising a first hydraulic pump driven interlockingly with the rotation of front wheels, a second hydraulic pump driven interlockingly with the rotation of rear wheels, and a hydraulic clutch for connecting the front wheels and rear wheels, the hydraulic clutch being adapted to be brought into an engaged state by an oil pressure built up on the basis of a difference between the amount of oil discharged from one of the hydraulic pumps and the amount of oil drawn into the other hydraulic pump, wherein the hydraulic clutch, the first hydraulic pump and the second hydraulic pump are arranged in sequence from the front toward the rear of the vehicle on an axis extending longitudinally of the vehicle.

According to the present invention, the first hydraulic pump that is driven interlockingly with the rotation of the front wheels and the second hydraulic pump that is driven interlockingly with the rotation of the rear wheels are arranged longitudinally adjacent each other on the axis extending longitudinally of the vehicle, whereby the oil passage connecting the ports of the two hydraulic pumps is significantly shortened. In addition, since the hydraulic clutch is disposed at the front end of the power transmitting system, the cooling effect provided by the running air is not blocked by the first hydraulic pump so that the hydraulic clutch can be effectively cooled.

A preferred embodiment of the present invention will now be described with reference to the accompanying drawings, herein.

Figure 1:
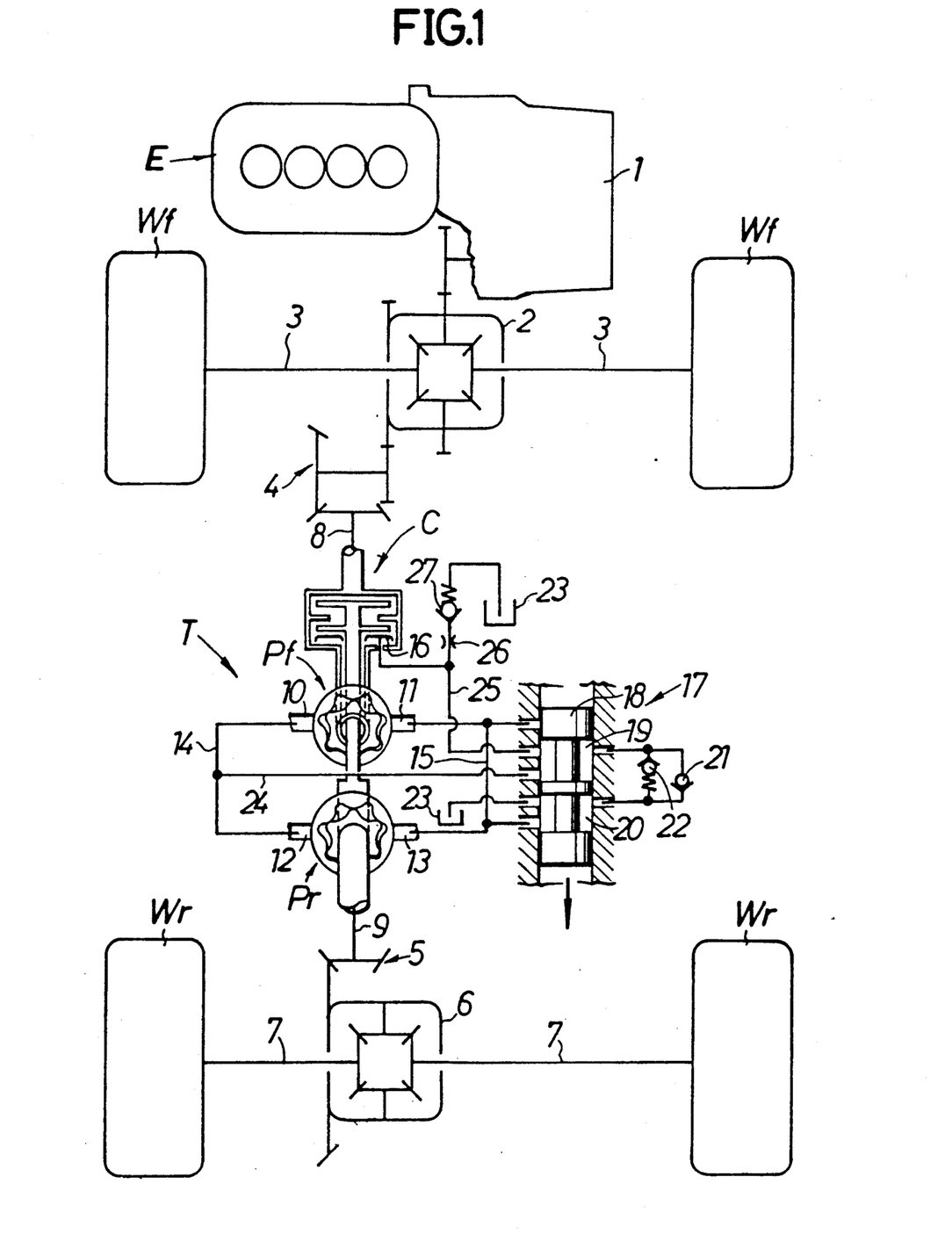
FIG. 1 is a schematic illustration showing the power transmitting system of this invention in a four-wheel drive vehicle.

As shown in FIG. 1, the output from an engine E mounted at a front portion of the four-wheel driven vehicle is supplied through a transmission 1 to a differential 2 for the front wheels and the output from the differential 2 is transmitted through drive shafts 3 to the left and right front wheels Wf. The output received by the differential 2 from the engine E also is supplied through a bevel gear device 4 to a power transmitting system T which will be described hereinafter. The output from the power transmitting system T is transmitted through a bevel gear device 5 to a differential 6 for the rear wheels, and the output from the differential 6 is transmitted through drive shafts 7 to left and right rear wheels Wr.

The power transmitting system T comprises a first hydraulic pump Pf driven by an input shaft 8 extending from the bevel gear device 4 in the front of the vehicle, a second hydraulic pump Pr driven by an output shaft 9 connected to the bevel gear device 5 in the rear of the vehicle, a hydraulically operated clutch C serving to permit the transmission and interruption of the driving force between the input shaft 8 and the output shaft 9, and a hydraulic pressure control circuit for controlling the clutch C. The clutch C is disposed at the front portion of the power transmitting system T, and the first and second hydraulic pumps Pf and Pr are arranged in series toward the rear of the vehicle from the clutch C.

The first hydraulic pump Pf comprises a trochoid pump and includes a first port 10 which serves as a discharge port during forward movement of the vehicle and as an intake port during backward movement of the vehicle, and a second port 11 which serves as an intake port during forward movement of the vehicle and as a discharge port during backward movement of the vehicle. The second hydraulic pump Pr likewise comprises a trochoid pump and includes a third port 12 which serves as an intake port during forward movement of the vehicle and as a discharge port during backward movement of the vehicle, and a fourth port 13 which serves as a discharge port during forward movement of the vehicle and as an intake port during backward movement of the vehicle. The first and third ports 10 and 12 are interconnected in communication through a first connecting oil passage 14, and the second and fourth ports 11 and 13 are interconnected in communication through a second connecting oil passage 15.

Figure 6:
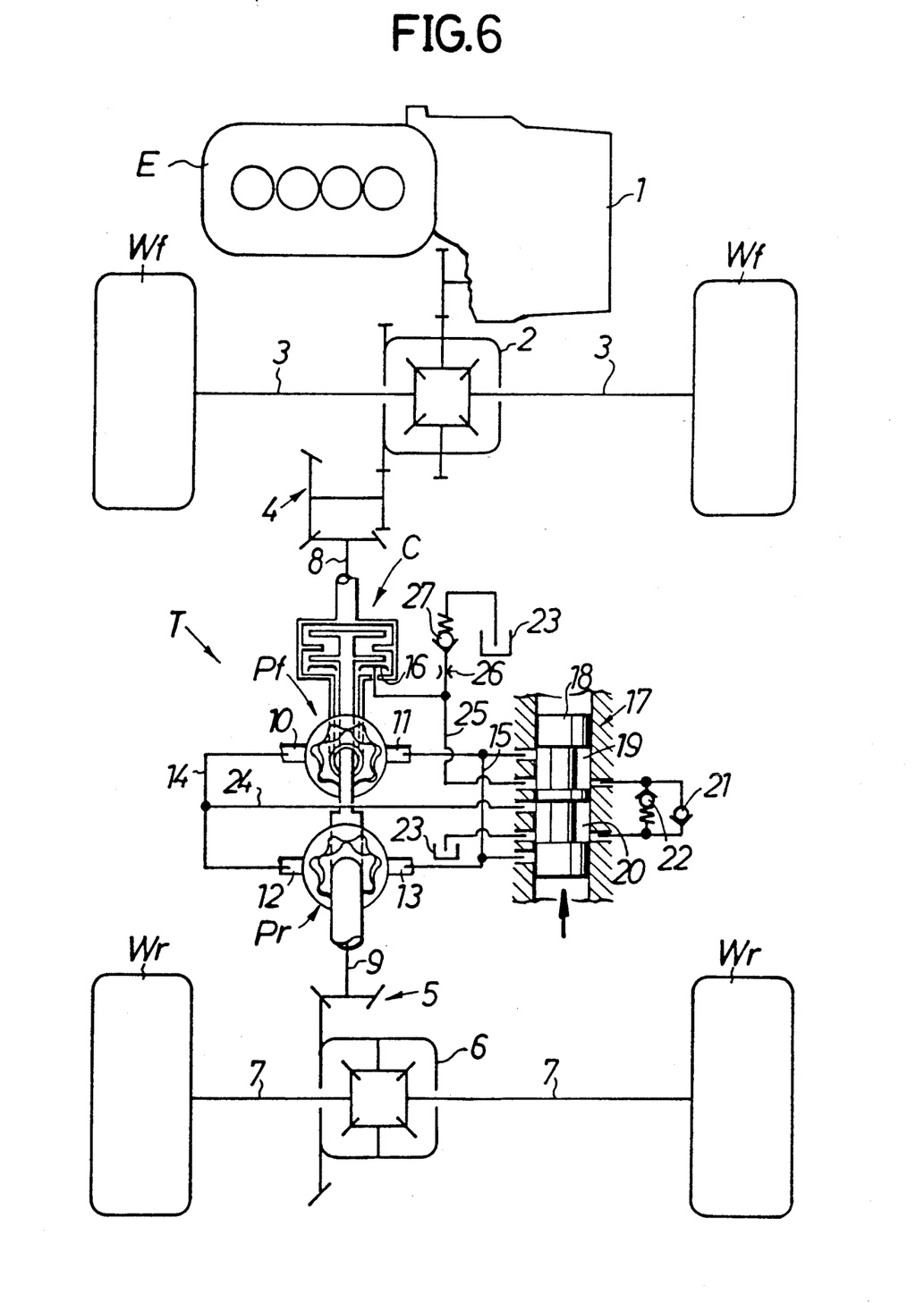
FIG. 6 is a schematic illustration similar to FIG. 1 for explaining the operation.

A switchover valve 17 is interposed between a working oil pressure chamber 16 in the clutch C and the first and second connecting oil passages 14 and 15 and the valve 17 is adapted to be switched between positions depending upon whether the transmission 1 is in a forward drive stage or backward drive stage. The switchover valve 17 includes a spool 18 operated by a solenoid or hydraulic pressure (not shown) controlled from transmission 1. Provided between a first valve chamber 19 and a second valve chamber 20 which are defined by the spool 18 is a one-way valve 21 which restrains the flow of oil from the first valve chamber 19 toward the second valve chamber 20 but allows oil flow in the reverse direction from chamber 20 to chamber 19, and a relief valve 22 which serves to connect the first valve chamber 19 to the second valve chamber 20 for communication with each other to permit the flow of oil from the first valve chamber 19 toward the second valve chamber 20 if the pressure in the first valve chamber 19 exceeds the pressure in the second valve chamber 20 by a predetermined value. During forward movement of the vehicle, the switchover valve 17 is in the position shown in FIG. 1 whereby the second connecting oil passage 15 and an oil tank 23 are put into communication with each other through the second valve chamber 20, while at the same time, the first connecting oil passage 14 and the working oil pressure chamber 16 in the clutch C are put into communication with each other through a bypass oil passage 24, the first valve chamber 19 and a working oil pressure supply oil passage 25, as shown in FIG. 1. Moreover, if the pressure applied to the working oil pressure chamber 16 in the clutch C is equal to or more than a predetermined value, the pressure escapes through the relief valve 22 into the oil tank 23. During backward movement of the vehicle, the spool 18 is caused to move forwardly to the position shown in FIG. 6, thereby permitting the first connecting oil passage 14 and the oil tank 23 to be put into communication with each other through the second valve chamber 20, while permitting the second connecting oil passage 15 and the working oil pressure chamber 16 in the clutch C to be put into communication with each other through the first valve chamber 19. Moreover, if the pressure applied to the working oil pressure chamber 16 in the clutch C is equal to or more than the predetermined value, the pressure escapes through the relief valve 22 into the oil tank 23.

Figure 5:
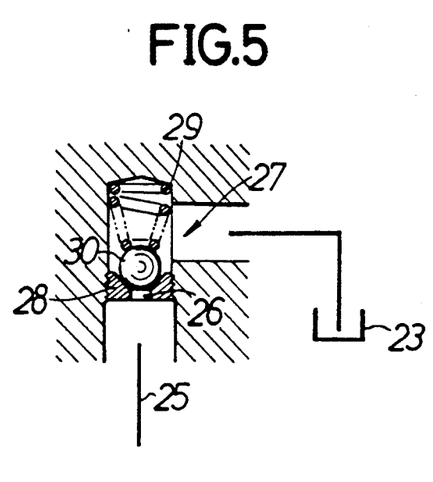
FIG. 5 is an enlarged view of an orifice-occluding means.

Further, the working oil pressure supply oil passage 25 connecting the first valve chamber 19 and the working oil pressure chamber 16 in the clutch C communicates with the oil tank 23 through a branch passage having an orifice 26 and an orifice-occluding means 27. As shown in FIG. 5, the orifice-occluding means 27, which is provided downstream of the orifice 26, includes a ball 30 which is resiliently biased toward a valve seat 28 by a spring 29 similar to a relief valve. Therefore, the oil pressure in the working oil pressure supply oil passage 25 is applied directly to the working oil pressure chamber 16 in the clutch C until such pressure exceeds a preset load of the spring 29. If such pressure exceeds the preset load of the spring 29, the ball 30 of the orifice-occluding means 27 is moved away from the valve seat 28, so that the oil under pressure in the working oil pressure supply passage 25 is passed through the orifice 26 to the oil tank 23 but the rate of flow is inhibited by the orifice 26.

Figure 2:
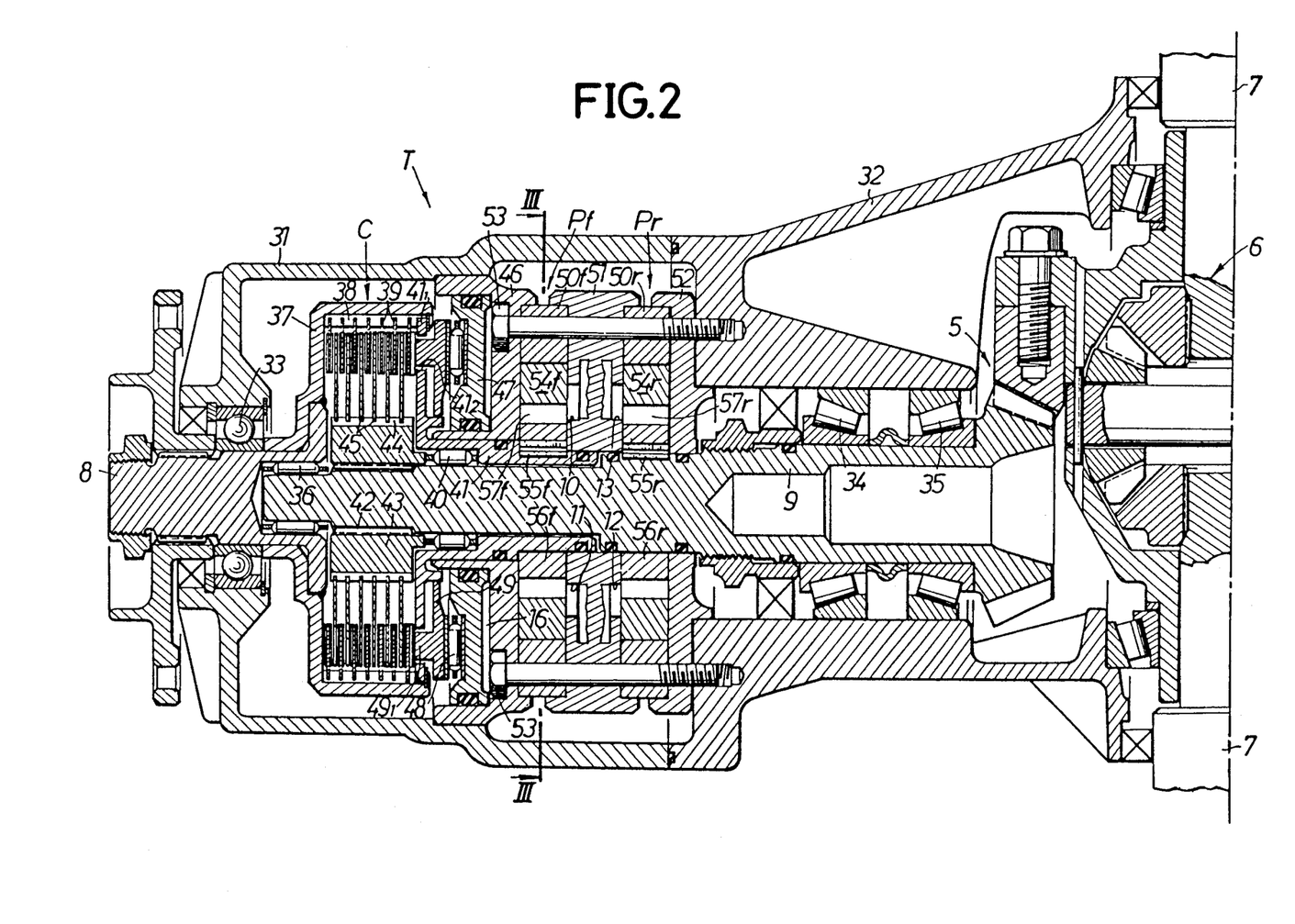
FIG. 2 is a longitudinal sectional view of the power transmitting system.

As shown in FIG. 2, the power transmitting system T includes front and rear casings 31 and 32, respectively. The input shaft 8 is supported in the front casing 31 by a ball bearing 33 interposed therebetween and the output shaft 9 is supported in the rear casing 32 by two roller bearings 34 and 35 interposed therebetween. The shafts 8 and 9 arranged coaxially with each other, with a front end of the output shaft 9 being engaged with a rear end of the input shaft 8 through a roller bearing 36 for relative rotation therebetween.

The clutch C is disposed at the front end of the casing 31 and includes a drum-shaped clutch housing 37 fixedly attached, such as by welding, to the rear end of the input shaft 8. A plurality of clutch plates 39 engage a spline 38 formed around the inner periphery of the clutch housing 37. The outer periphery of a flange $41_1$, which is integrally formed on a sleeve 41 that is relatively rotatably supported on the outer periphery of the output shaft 9 through a needle bearing 40, engages the rear end of the spline 38. Therefore, the sleeve 41 is coupled to the input shaft 8 through the clutch housing 37 and rotatable in unison with the input shaft 8. A clutch boss 43 is secured to the front end of the output shaft 9 through a spline 42 and a plurality of clutch plates 45 engage a spline 44 formed around the outer periphery of the clutch boss 43. The clutch plates 39 carried on the side of the clutch housing 37 and the clutch plates 45 carried on the side of the clutch boss 43 are alternately arranged within the clutch housing 37 so that they can be permitted to abut against each other.

A front plate 46 (which will be described in detail hereinafter) of the first hydraulic pump Pf is located in the rear of the clutch C, and a pusher plate 49 is engaged, through a thrust bearing 48, with the front face of a clutch piston 47 which is axially slidably received in a cavity in the front plate 46. The pusher plate 49 is axially slidably carried on the sleeve 41 and has a plurality of projections $49_1$ which protrude therefrom at a plurality of circumferential points and pass through holes $41_2$ provided in the flange $41_1$ of the sleeve 41 to abut against the rearmost clutch plate 39. Thus, if a hydraulic pressure is applied to the working oil pressure chamber 16 defined between the front plate 46 and the clutch piston 47, the pusher plate 49 is advanced by the clutch piston 47 and the thrust bearing 48, so that the projections $49_1$ of the pusher plate 49 bring the clutch plates 39 and 45 into close contact with each other. This causes the rotation of the input shaft 8 to be transmitted to the output shaft 9 via the clutch housing 37, the spline 38, the clutch plates 39, the clutch plates 45, the spline 44, the clutch boss 43 and the spline 42.

Figure 3:
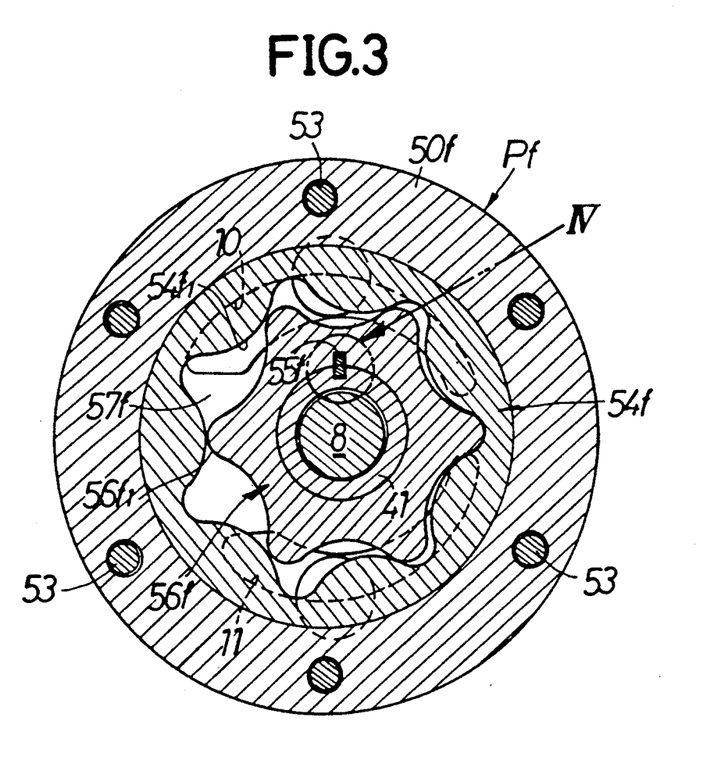
FIG. 3 is a sectional view illustrating a hydraulic pump of the power transmitting system, taken along a line III—III in FIG. 2.

The first hydraulic pump Pf and the second hydraulic pump Pr are mounted in a longitudinally overlapped relationship to each other on the front wall of the rear casing 32, with the peripheries thereof being surrounded by the front casing 31. More specifically, the front plate 46 carrying the clutch piston 47, a pump housing 50f of the first hydraulic pump Pf, a central plate 51, a pump housing 50r of the second hydraulic pump Pr and a rear plate 52 are stacked and clamped together on the front wall of the rear casing 32 by a plurality of bolts 53. It can be seen from FIGS. 2 and 3 that an outer rotor 54f having internal teeth $54f_1$ formed around an inner periphery thereof is rotatably disposed inside the pump housing 50f of the first hydraulic pump Pf, and an inner rotor 56f coupled to the sleeve 41 through a key 55f as a connecting means is disposed inside the outer rotor 54f, with external teeth $56f_1$ formed around an outer periphery of the inner rotor 56f being meshed with the internal teeth $54f_1$ of the outer rotor 54f. As is well known, the number of the internal teeth $54f_1$ of the outer rotor 54f is more by one than the number of the external teeth $56f_1$ of the inner rotor 56f, and the center of the inner rotor 56f is offset eccentrically from the center of the outer rotor 54f. This defines, between the inner and outer rotors 56f and 54f, a plurality of working chambers 57f which are capable of being expanded and contracted in volume by rotation of the inner and outer rotors 56f and 54f. The above-described first and second ports 10 and 11 are defined in the central plate 51 in an opposed relation to the working chamber 57f.

Figure 4:
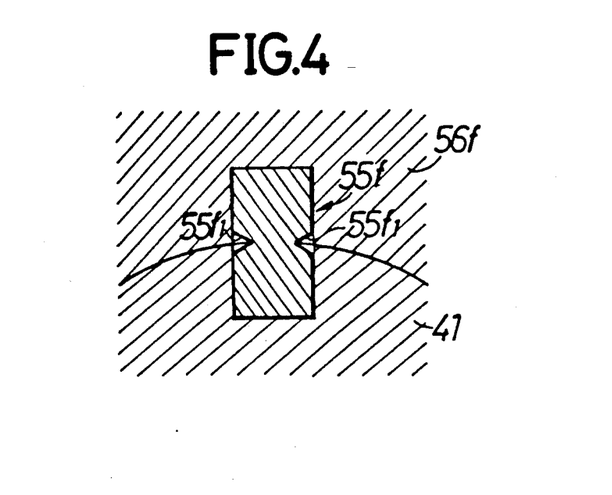
FIG. 4 is an enlarged view of a portion of FIG. 3 indicated by the circle IV in FIG. 3.

As shown in FIG. 4, two grooves $55f_1$ are provided in the key 55f for coupling the inner rotor 56f to the sleeve 41 integral with the input shaft 8, so that if an excessive torque is applied between the sleeve 41 and the inner rotor 56f, the key 55f is broken at the area of the grooves $55f_1$ to release the coupling of the sleeve 41 with the inner rotor 56f.

The second hydraulic pump Pr located between the central plate 51 and the rear plate 52 has the same structure as the first hydraulic pump Pf and hence, its components are only shown with reference characters with a suffix r attached thereto and a duplicate description thereof is omitted. However, the only difference between the two pumps is that the inner rotor 56f of the first hydraulic pump Pf is coupled through the key 55f to the sleeve 41 that is connected to and rotates with the input shaft 8, whereas the inner rotor 56r of the second hydraulic pump Pr is coupled to the output shaft 9 through a key 55r having the same structure as the key 55f. The third and fourth ports 12 and 13 of the second hydraulic pump Pr are defined in the central plate 51 in which the first and second ports 10 and 11 of the first hydraulic pump Pf are also defined.

The operation of the preferred embodiment of the present invention now will be described.

Upon the start of forward movement, the driving force from the engine E is transmitted via the transmission 1, the differential 2 and the drive shafts 3 to the front wheels Wf and from the differential 2 via the bevel gear device 4 and the input shaft 8 to the first hydraulic pump Pf to drive the latter. Before the start of forward movement of the vehicle, the clutch C is in a disengaged state, and the second hydraulic pump Pr is in a stopped state. As forward movement occurs, the entire amount of oil drawn from the oil tank 23 via the second valve chamber 20 and the second connecting oil passage 15 into the second port 11 of the first hydraulic pump Pf, due to the rotation of input shaft 8, is discharged through the first port 10 into the first connecting oil passage 14 and flows into the bypass oil passage 24, thereby applying an oil pressure to the working oil pressure chamber 16 in the clutch C through the first valve chamber 19 and the working oil pressure supply oil passage 25. Thereupon, the clutch C is engaged, so that the rear wheels Wr are driven through the output shaft 9, the bevel gear device 5, the differential 6 and the drive shafts 7, while at the same time, the second hydraulic pump Pr connected to the output shaft 9 is driven. When the clutch C becomes engaged so that the driving torque is distributed to the rear wheel Wr in this manner, the oil discharged from the first hydraulic pump Pf is drawn through the first connecting oil passage 14 into the second hydraulic pump Pr, and the oil discharged from the second hydraulic pump Pr is drawn through the second connecting oil passage 15 into the first hydraulic pump Pf, in response to the increase in the rotational speed of the rear wheels Wr. The magnitude of the oil pressure applied to the working oil pressure chamber 16 in the clutch C, i.e., the engagement force for the clutch C, is automatically varied in accordance with the difference between the amount of oil discharged from the first hydraulic pump Pf and the amount of oil drawn into the second hydraulic pump Pr. If a stable driving condition, e.g., a constant-speed travelling condition in which the difference between the rotational speeds of the front and rear wheels is substantially zero is reached, the oil pressure is not applied to the working oil pressure chamber 16 in the clutch C, so that the distribution of the torque to the rear wheels is cut off.

Figure 7:
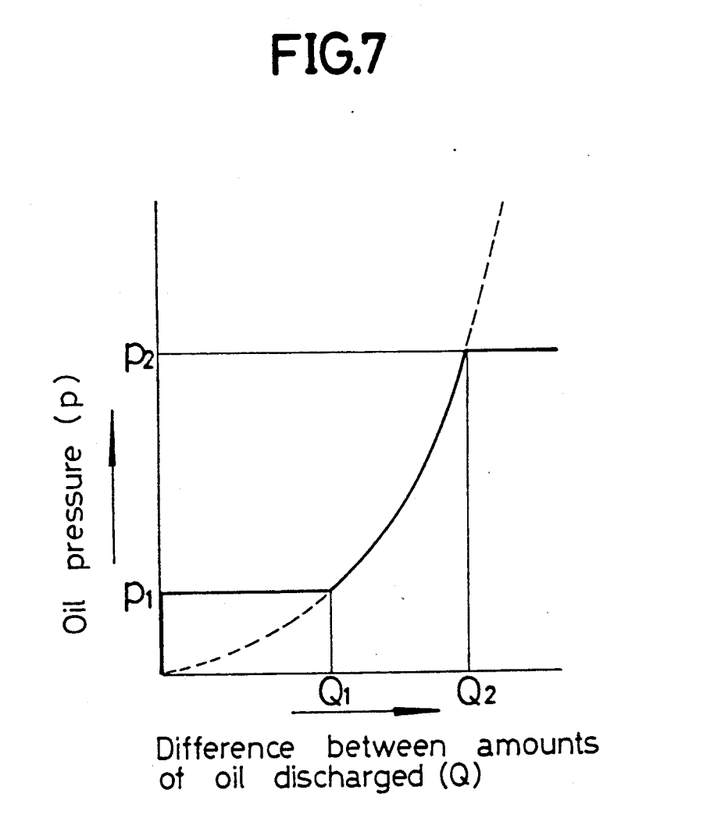
FIG. 7 is a graph illustrating the hydraulic pressure characteristic provided by the orifice-occluding means.

The oil pressure p upstream of the orifice 26, i.e., the oil pressure p applied to the working oil pressure chamber 16 in the clutch C is varied in proportion to the square of a difference Q between the amounts of oil discharged from (or drawn into) the first and second hydraulic pumps Pf and Pr and hence, the variation in such oil pressure p includes a portion as indicated by a parabolic line as shown in FIG. 7. That is, even if the difference Q is generated, the oil pressure p upstream of the orifice occluding means 27 is not immediately increased but, when the difference Q reaches a given value $q_1$, the oil pressure p is simultaneously increased. Then, when the oil pressure p reaches a given value $p_1$, since the orifice occluding means 27 is opened, thereby permitting the oil under pressure to be passed through the orifice 26, the oil pressure p is increased in a parabolic line. If the difference Q then reaches a given value $Q_2$ and the oil pressure p reaches a value $p_2$ corresponding to a preset load of the relief valve 22, the oil under pressure in the working oil supply oil passage 25 is returned through the relief valve 22 to the oil tank 23, so that the oil pressure p is kept at the given value $p_2$. Therefore, the maximum value $p_2$ of the oil pressure, i.e., an upper limit value of the torque transmitted by the clutch C can be properly set by setting of the preset load of the relief valve 22. It should be noted that the difference $Q_1$ in FIG. 7, i.e., the difference $Q_1$ generated by the oil pressure $p_1$ which is released by the orifice occluding means 27 is extremely small. Therefore, in an actual operation, when the difference Q is generated and the oil pressure p reaches $p_1$, the oil pressure p starts increasing in a parabolic line substantially simultaneously. In addition, because the predetermined oil pressure $p_1$ is applied to the working oil pressure chamber 16 in the clutch C through the aid of the orifice-occluding means 27 concurrently with the development of the difference Q between the amounts of oil discharged from the first and second hydraulic pumps Pf and Pr, the clutch C can be engaged quickly without any time lag and has an improved response.

When only the front wheels Wf ride on a road surface of a lower frictional coefficient during a constant-speed travelling, or when only the front wheels Wf are caused to be rapidly increased in speed, they may transiently assume a slip state. In such a state, the amount of oil discharged from the first hydraulic pump Pf connected to the input shaft 8 exceeds the amount of oil drawn into the second hydraulic pump Pr connected to the output shaft 9, and the clutch C is likewise engaged, so that the driving torque is distributed to the rear wheels Wr.

If braking forces are applied to the wheels, the front wheels Wf are liable to be locked early, because a balance of braking forces for the front and rear wheels is such that the braking force for the front wheels Wf is generally set higher than that for the rear wheels Wr. An engine-braking from a constant-speed travelling condition is applied to only the front wheels Wf and even in this event, the rotational speed of the front wheels Wf transiently becomes lower than that of the rear wheels Wr. In either such a case, the amount of oil discharged from the second hydraulic pump Pr exceeds the amount of oil drawn into the first hydraulic pump Pf, so that an excessive amount of the oil is discharged into the second connecting oil passage 15. Further, when the front wheels Wf have been completely locked, the first hydraulic pump Pf is stopped, while only the second hydraulic pump Pr is rotated, so that the whole amount of oil discharged from the second hydraulic pump Pr is excessive. However, this excessive discharged oil is passed from the second connecting oil passage 15 through the second valve chamber 20, the one-way valve 21, the first valve chamber 19, the bypass oil passage 24 and the first connecting oil passage 14 back to the third port 12. If the rotational speed of the rear wheels Wr exceeds that of the front wheels Wf in this manner, the oil pressure is not applied to the working oil pressure chamber 16 in the clutch C, so that the clutch C is maintained in the disengaged state.

During the backward movement, the rotational directions of the first and second hydraulic pumps Pf and Pr are reversed together, and the relationship between the intake and discharge ports is reversed from the above-described relationship. However, the spool 18 of the switchover valve 17 is moved to the position shown in FIG. 6 as a result of the interlocking with the transmission 1 and therefore, the basic principle of operation is the same as during the forward movement.

More specifically, if the rotational speed of the front wheels Wf becomes larger than that of the rear wheels Wr at the start of the backward movement or during a rapid increase of speed, the amount of oil discharged from the first hydraulic pump Pf is more than the amount of oil drawn into the second hydraulic pump Pr. For this reason, oil in the amount corresponding to a difference between the amount of oil discharged through the second port 11 and the amount of oil drawn through the fourth port 13 is supplied from the second connecting oil passage 15 through the first valve chamber 19 and the working oil pressure supply oil passage 25 into the working oil pressure chamber 16 in the clutch C, so that the clutch C is engaged to permit the driving torque to be distributed to the rear wheels Wr. If the difference between the amount of oil discharged from the first hydraulic pump Pf and the amount of oil drawn into the second hydraulic pump Pr is reduced in response to an increase in the rotational speed of the rear wheels Wr to provide the constant-speed travelling state, the oil pressure is not applied to the working oil pressure chamber 16 in the clutch C, and therefore the connection between the front and rear wheels is cut off.

During braking in backward movement, the rotational speed of the first hydraulic pump Pf is less than that of the second hydraulic pump Pr. For this reason, the discharge pressure to the working oil pressure supply passage 25 does not build up and the clutch C is not engaged, as occurs during braking in forward movement. During this time, a portion of the oil discharged through the third port 12 in the second hydraulic pump Pr is passed through the first connecting oil passage 14, the bypass oil passage 24, the second valve chamber 20, the one-way valve 21, the first valve chamber 19 and the second connecting oil passage 15 back to the fourth port 13. If the front wheels Wf are completely locked, the entire amount of the oil discharged through the third port 12 is passed through the above-described path back to the fourth port 13 and, even in this case, the clutch C is not engaged and the connection between the front and rear wheels is cut off.

Now, if the first hydraulic pump Pf or the second hydraulic pump Pr seizes for any reason during operation of the power transmitting system T, the outer rotor 54f, 54r or the inner rotor 56f, 56r thereof is integrally secured to the stationary part of the system T, i.e., to the pump housing 50f, 50r or the plates 46, 51, 52. Thereupon, a large torque, as compared with the torque during a normal operation, is applied between the sleeve 41 or the output shaft 9 and the inner rotor 56f, 56r, and this torque causes the key 55f, 55r securing the inner rotor 56f, 56r to the sleeve 41 or the output shaft 9, respectively, to be sheared from the area of the grooves $55f_1$, $55r_1$. This ensures that the torque of the sleeve 41 or the output shaft 9 is not transmitted to the seized inner rotor 56f, 56r and outer rotor 54f, 54r and thus, damage to the stationary parts of the power transmitting system T is prevented.

In addition, since the first and second hydraulic pumps Pf and Pr are juxtaposed with only the central plate 51 interposed therebetween, the oil passage connecting the ports 10, 11, 12, 13 of the hydraulic pumps Pf and Pr is shortened by defining the ports of the hydraulic pumps Pf and Pr in the central plate 51. In contrast, the prior art arrangement positioned the clutch axially between the two pumps requiring lengthy oil passages around the clutch from one clutch to the other.

Moreover, the clutch C develops heat by the sliding contact between the clutch plates 39 and 45, but since the hydraulic clutch C is disposed at that frontmost portion of the power transmitting system T which provides the maximum cooling effect by the running air circulation, the developed heat is dissipated efficiently, thereby ensuring that the rise in temperature of the hydraulic clutch C is suppressed. In contrast, with the prior art arrangement having the clutch between the two pumps, the air cooling of the clutch was ineffective.

Although the preferred embodiment of the present invention has been described above in detail, it will be understood that the present invention is not limited to the above-described embodiment, and various modifications in the design thereof will be apparent to those skilled in the art without departing from the scope and spirit of the present invention. For example, the first and second hydraulic pumps Pf and Pr need not necessarily be trochoid pumps but rather they may be inscribedtype gear pumps having a crescent (partition member) between an outer rotor and an inner rotor.

What is claimed is:

1. A power transmitting system for a four-wheel drive vehicle, comprising a first hydraulic pump driven interlockingly with the rotation of front wheels, a second hydraulic pump driven interlockingly with the rotation of rear wheels and a hydraulic clutch for connecting said front wheels and rear wheels, said hydraulic clutch being adapted to be brought into an engaged state by an increase in oil pressure based on a difference between the amount of oil discharged from one of said hydraulic pumps and the amount of oil drawn into the other hydraulic pump, wherein said hydraulic clutch, said first hydraulic pump and said second hydraulic pump are arranged in that sequence from the front toward rear of the vehicle on an axis extending longitudinally of the vehicle.

2. The power transmitting system of claim 1, wherein an inlet and outlet of one said hydraulic pump are connected to an outlet and inlet, respectively, of the other said hydraulic pump.

3. The power transmitting system of claim 2, wherein said hydraulic pump inlets and outlets also are connected to a switchover valve for applying the oil pressure to the hydraulic clutch when the vehicle is operated in reverse.

4. The power transmitting system of claim 1, wherein the hydraulic clutch is provided with a pressure chamber for causing engagement of the hydraulic clutch upon an increase in oil pressure in said pressure chamber, an orifice and an orifice-occluding means in communication with said pressure chamber for controlling elevated pressures in said pressure chamber.

5. The power transmitting system of claim 1, wherein the hydraulic clutch is provided with a pressure chamber for causing engagement of the hydraulic clutch upon an increase in oil pressure in said pressure chamber, a pressure relief valve communicating with said pressure chamber for limiting the maximum oil pressure in said pressure chamber.

6. The power transmitting system of claim 1, wherein a check valve and oil passage is provided for supplying oil pressure to the hydraulic clutch when the amount of oil discharged from the one hydraulic pump exceeds the amount of oil discharged from the other pump.

7. A power transmitting system for a four-wheel drive vehicle, comprising a first hydraulic pump driven interlockingly with the rotation of front wheels, a second hydraulic pump driven interlockingly with the rotation of rear wheels and a hydraulic clutch for connecting said front wheels and rear wheels, said first hydraulic pump having an inlet and outlet and said second hydraulic pump having an inlet and outlet, the inlet and outlet of said first hydraulic pump being connected to the outlet and inlet, respectively, of the second hydraulic pump, said hydraulic clutch being adapted to be brought into an engaged state by an increase in oil pressure based on a difference between the amount of oil discharged from one of said hydraulic pumps and the amount of oil drawn into the other hydraulic pump, wherein said hydraulic clutch, said first hydraulic pump and said second hydraulic pump are arranged in that sequence from the front toward the rear of the vehicle on an axis extending longitudinally of the vehicle, and wherein a center plate separates said hydraulic pumps, and said inlets and outlets of said hydraulic pumps are formed in said plate.

8. The power transmitting system of claim 7, wherein an end plate is provided on each side of said center plate, and each hydraulic pump is mounted between said center plate and said end plate.

9. The power transmitting system of claim 8, wherein said hydraulic pumps, end plates and center plate are positioned in an axially stacked arrangement, and a plurality of axially extending bolts extend through holes in and assembly said hydraulic pumps, end plates and center plate.

10. A power transmitting system for a four-wheel drive vehicle, comprising a first hydraulic pump driven in proportion to the rotation of rear wheels, a second hydraulic pump driven in proportion of the rotation of rear wheels, and a hydraulic clutch for selectively connecting said front wheels and rear wheels, said hydraulic clutch having means for causing engagement thereof in response to a difference between the amount of oil discharged from one of said hydraulic pumps and the amount of oil drawn into the other hydraulic pump, said hydraulic clutch, said first hydraulic pump, and said second hydraulic pump are arranged in that sequence from the front toward the rear of the vehicle on an axis extending along the longitudinal axis of the vehicle, said first hydraulic pump and said second hydraulic pump positioned in adjacent relationship with an inlet and outlet of one pump directly connected to outlet and inlet, respectively, of the other pump for minimizing flow resistance between the two hydraulic pumps.

11. A power transmitting system for a four-wheel drive vehicle, comprising a first hydraulic pump driven in proportion to the rotation of front wheels, a second hydraulic pump driven in proportion to the rotation of rear wheels, and a hydraulic clutch for selectively connecting said front wheels and rear wheels, said hydraulic clutch having means for causing engagement thereof in response to a difference between the amount of oil discharged from one of said hydraulic pumps and the amount of oil drawn into the other hydraulic pump, said first hydraulic pump and said second hydraulic pump positioned in adjacent relationship with an inlet and outlet of one pump directly connected to an outlet and inlet, respectively, of the other pump for minimizing flow resistance between the two hydraulic pumps, and said two hydraulic pumps each have an axis of rotation, said axes are aligned, and said two hydraulic pumps are separated by a plate having means forming and connecting said inlets and outlets.

* * * * *